United States Patent
Gill

(10) Patent No.: US 11,516,894 B2
(45) Date of Patent: Nov. 29, 2022

(54) INDUCTION HEATING ASSEMBLY FOR A VAPOUR GENERATING DEVICE

(71) Applicant: JT International S.A., Geneva (CH)

(72) Inventor: Mark Gill, London (GB)

(73) Assignee: JT International SA

( * ) Notice: Subject to any disclaimer, the term of this patent is extended or adjusted under 35 U.S.C. 154(b) by 93 days.

(21) Appl. No.: 16/638,294

(22) PCT Filed: Sep. 3, 2018

(86) PCT No.: PCT/EP2018/073616
§ 371 (c)(1),
(2) Date: Feb. 11, 2020

(87) PCT Pub. No.: WO2019/048379
PCT Pub. Date: Mar. 14, 2019

(65) Prior Publication Data
US 2020/0170300 A1 Jun. 4, 2020

(30) Foreign Application Priority Data
Sep. 6, 2017 (EP) ..................... 17189677

(51) Int. Cl.
*A24F 13/00* (2006.01)
*H05B 6/10* (2006.01)
*H02J 50/10* (2016.01)
*A24F 40/90* (2020.01)
*A24F 40/465* (2020.01)
*A24F 40/57* (2020.01)
(Continued)

(52) U.S. Cl.
CPC ........... *H05B 6/108* (2013.01); *A24F 40/465* (2020.01); *A24F 40/57* (2020.01); *A24F 40/90* (2020.01); *H01F 38/14* (2013.01); *H02J 7/0044* (2013.01); *H02J 7/02* (2013.01); *H02J 50/10* (2016.02); *A24F 40/20* (2020.01)

(58) Field of Classification Search
CPC ....................................... A24F 47/00
USPC ................................. 131/328–329
See application file for complete search history.

(56) References Cited

U.S. PATENT DOCUMENTS

2014/0224267 A1 8/2014 Levitz et al.
2017/0112196 A1* 4/2017 Sur ...................... H05B 1/0227
(Continued)

FOREIGN PATENT DOCUMENTS

CN 204091003 U 1/2015
CN 204444238 U * 7/2015
(Continued)

OTHER PUBLICATIONS

International Search Report including Written Opinion for application No. PCT/EP2018/073616, dated Dec. 21, 2018, 14 pages.
(Continued)

*Primary Examiner* — Phuong K Dinh
(74) *Attorney, Agent, or Firm* — Lerner, David, Littenberg, Krumholz & Mentlik, LLP

(57) ABSTRACT

An induction heating assembly for a vapour generating device includes a rechargeable power source and an induction coil. The induction coil is arranged to heat, in use, a susceptor and is also arranged to receive, in use, an electromagnetic field generated by an external source to charge the power source.

18 Claims, 5 Drawing Sheets

(51) Int. Cl.
*H01F 38/14* (2006.01)
*H02J 7/02* (2016.01)
*H02J 7/00* (2006.01)
*A24F 40/20* (2020.01)

(56) References Cited

U.S. PATENT DOCUMENTS

2018/0157887 A1\* 6/2018 D'Ercoli ............... G06K 7/1413
2020/0245684 A1\* 8/2020 Mironov ................. H05B 6/44

FOREIGN PATENT DOCUMENTS

| CN | 108634371 | A | \* | 10/2018 |
| TW | 201006087 | A |  | 2/2010 |
| TW | 201422061 | A |  | 6/2014 |
| WO | 2015177255 | A1 |  | 11/2015 |
| WO | 2017085242 | A1 |  | 5/2017 |
| WO | 2017109448 | A2 |  | 6/2017 |
| WO | 2017118553 | A1 |  | 7/2017 |

OTHER PUBLICATIONS

Search Report dated Jul. 28, 2021 from Office Action for Chinese Application No. 201880057345.7 dated Aug. 3, 2021. 3 pgs.

\* cited by examiner

INDUCTION HEATING ASSEMBLY FOR A VAPOUR GENERATING DEVICE

CROSS-REFERENCE TO RELATED APPLICATIONS

The present application is a national phase entry under 35 U.S.C. § 371 of International Application No. PCT/EP2018/073616, filed Sep. 3, 2018, published in English, which claims priority to European Application No. 17189677.2 filed Sep. 6, 2017, the disclosures of which are incorporated herein by reference.

BACKGROUND OF THE INVENTION

The present invention relates to an induction heating assembly for a vapour generating device. Devices which heat, rather than burn, a substance to produce a vapour for inhalation have become popular with consumers in recent years.

Such devices can use one of a number of different approaches to provide heat to the substance. One such approach is a vapour generating device which employs an inductive heating system. In such a device an induction coil (hereinafter also referred to as an inductor) is provided with the device and a susceptor is provided with the vapour generation substance. Electrical energy is provided to the inductor when a user activates the device which in turn creates an electromagnetic field. The susceptor couples with the field and generates heat which is transferred to the substance and vapour is created as the substance is heated.

Such an approach has the potential to provide better control of heating and therefore vapour generation. However, in practice such an approach can result in a relatively bulky device with a large number of components. This can make it expensive to produce and inconvenient to users who expect a simple and compact device.

Users expect such a device to be rechargeable, so a safe and reliable system for recharging the vapour generating device is desirable. However, the installation of such a recharging system along with a rechargeable power source can lead to an even larger number of components in a bulky and heavy device.

The present invention seeks to mitigate at least some of the above problems.

SUMMARY OF THE INVENTION

According to a first aspect of the present invention, there is provided an induction heating assembly for a vapour generating device, the heating assembly comprising a rechargeable power source; and an induction coil; wherein the induction coil is arranged to heat, in use, a susceptor and is also arranged to receive, in use, an electromagnetic field generated by an external source to charge the power source.

By using the induction coil for both emitting and receiving an electromagnetic field, it is possible to reliably provide inductive heating and inductive charging from the same member in a vapour generating device. This leads to a reduced component count improving size, weight, production cost and safety of the device.

The susceptor may comprise one or more of, but not limited to, aluminium, iron, nickel, stainless steel and alloys thereof (e.g. Nickel Chromium). With the application of an electromagnetic field in its vicinity, the susceptor may generate heat due to eddy currents and magnetic hysteresis losses resulting in a conversion of energy from electromagnetic to heat.

Preferably, the induction heating assembly further comprises an inverter arranged to change a direct current from the power source to an alternating high-frequency current; a rectifier arranged to change an alternating high-frequency current from the induction coil to a direct current; and an induction controller arranged to be, in use, in electrical connection with the power source, the induction coil, the rectifier and with the inverter such that, in use, the alternating high-frequency current can be selectively supplied to the induction coil and a susceptor can be inductively heated by the induction coil and, in use, a direct current can be selectively supplied to the power source when power is received at the induction coil in the form of an electromagnetic field generated by an external source, to inductively charge the power source.

The induction controller provides a means for controlling the induction capabilities of the heating assembly, by selectively supplying electrical current to the induction coil and the power source. This allows the user of the device to efficiently control the extent of both the heating and the charging functionalities through the induction coil and to supply electrical current only when it is needed.

The use of a single control unit to control the two functionalities through the induction coil reduces the component count and improves the safety of the heating assembly. The inclusion of an inverter and rectifier is advantageous in some situations in which the current within the heating assembly needs to be switched between alternating and direct current.

The assembly may be arranged to operate in use with a fluctuating electromagnetic field having a magnetic flux density of between approximately 0.5 T and approximately 2.0 T at the point of highest concentration.

The power source and circuitry may be configured to operate at a high frequency. Typically, the power source and circuitry may be configured to operate at a frequency of between approximately 80 kHz and approximately 500 kHz, preferably between approximately 150 kHz and approximately 250 kHz, more preferably 200 kHz.

Whilst the induction coil may comprise any suitable material, typically the induction coil may comprise a Litz wire or a Litz cable.

Whilst the heating assembly may take any shape and form, it may be arranged to take substantially the form of the induction coil, to reduce excess material use. Preferably, the induction coil is substantially cylindrical in shape.

The circular cross-section of a cylindrical induction coil is ideal for inserting a body to be inductively heated and heating the body uniformly, and leads to a shape of a heating assembly which is comfortable for the user to hold.

Preferably, the inverter and the rectifier are the same member arranged to selectively change a direct current from the power source to an alternating high-frequency current, and to selectively change an alternating high-frequency current from the induction coil to a direct current.

Since the roles of the inverter and the rectifier in switching between direct current and alternating current are substantially similar functions played in reverse, it is possible to employ a single member to invert a direct current in one direction and to rectify an alternating current in the other direction. This provides a simple and reliable solution to reduce the cost of production and number of components in the heating assembly, and results in a significantly more compact and lightweight device.

The heating assembly may be charged by placing an external source of electromagnetic field in proximity to the induction coil. Typically, the external source may comprise an external induction coil for receiving and transmitting an electromagnetic field. Whilst the external source may interact with the induction coil in any fashion, typically the heating assembly is arranged to receive at least a portion of an external source of an electromagnetic field within its volume.

By placing a portion of the external source inside the heating assembly (in some examples, by providing a projection (forming part of the external source) which can be inserted into the heating compartment when no body/capsule is located in the compartment), it is possible to ensure a safe and compact wireless connection between the external source of electromagnetic field and the induction coil of the heating assembly. This arrangement ensures that the electromagnetic coupling between the induction coil and external source is strong, to increase the efficiency of inductive charging to the power source of the induction heating assembly. Furthermore, in this arrangement, the heating assembly acts as a shield against electromagnetic field while charging.

Alternatively, at least a portion of the assembly is arranged to be, in use, inserted in the volume of an external source of an electromagnetic field. The external source may have an opening and a portion of its internal volume within which the assembly may be inserted. Alternatively, the external source may have a through hole therein such that its internal perimeter allows the assembly to be inserted therethrough. This allows the mouthpiece to be exposed while operating in connection with a compact external source, even in examples where the mouthpiece encloses the heating compartment when attached to the vapour generating device.

When coupling the assembly to an external device, either internally or externally, there may be situations in which a stable physical connection is required. The device may be provided with means for fixing the position of the external source in relation to the induction heating assembly. Preferably, there may be means for fixing the position of the external coil in relation to the induction coil of the assembly, such as a snap-fit mechanism. This may allow the two devices to be physically coupled such that the electromagnetic coupling may also be maintained.

There may be situations in which it is advantageous to provide an electromagnetic field for charging from outside the induction heating assembly as detailed later.

According to the present invention, there is also provided a vapour generating device comprising: an induction heating assembly according to the first aspect of the present invention; a heating compartment arranged to receive a body comprising a vaporisable substance and an induction heatable susceptor; an air inlet arranged to provide air to the heating compartment; an air outlet in communication with the heating compartment.

By using a heating assembly which is optimised for multiple functions of heating and charging the vapour generating device, it is possible to provide a reliable, lightweight and compact vapour generating device.

The body may be a capsule which includes in use a vaporisable substance inside an air permeable shell. The air permeable material may be a material which is electrically insulating and non-magnetic. The material may have a high air permeability to allow air to flow through the material with a resistance to high temperatures. Examples of suitable air permeable materials include cellulose fibres, paper, cotton and silk. The air permeable material may also act as a filter. Alternatively, the body may be a vaporisable substance wrapped in paper. Alternatively, the body may be a vaporisable substance held inside a material that is not air permeable, but which comprises appropriate perforation or openings to allow air flow. Alternatively, the body may be the vaporisable substance itself. The body may be formed substantially in the shape of a stick.

The vaporisable substance may be any type of solid or semi-solid material. Example types of vaporisable solids include powder, granules, pellets, shreds, strands, porous material or sheets. The substance may comprise plant derived material and in particular, the substance may comprise tobacco.

Preferably, the vaporisable substance may comprise an aerosol-former. Examples of aerosol-formers include polyhyrdric alcohols and mixtures thereof such as glycerine or propylene glycol. Typically, the vaporisable substance may comprise an aerosol-former content of between approximately 5% and approximately 50% on a dry weight basis. Preferably, the vaporisable substance may comprise an aerosol-former content of approximately 15% on a dry weight basis.

The vaporisable substance may be the aerosol-former itself. In this case, the vaporisable substance may be liquid. In this case, the body may have a liquid retaining substance (e.g. a bundle of fibres, porous material such as ceramic, etc.) which retains the liquid to be vaporised by a vaporiser such as a heater, and allows a vapour to be formed and released or emitted from the liquid retaining substance towards the air outlet for inhalation by a user.

Upon heating, the vaporisable substance may release volatile compounds. The volatile compounds may include nicotine or flavour compounds such as tobacco flavouring.

Since the induction coil produces an electromagnetic field when operating to heat a susceptor, any member comprising an induction heatable susceptor will be heated when placed in proximity to the device in operation, and as such there is no restriction on the shape and form of the body being received by the heating compartment. Preferably, the body to be heated is cylindrical in shape and as such the heating compartment is arranged to receive a substantially cylindrical vaporisable article.

The ability of the heating compartment to receive a substantially cylindrical member to be heated is advantageous as, often, vaporisable substances and tobacco products in particular, are packaged and sold in a cylindrical form.

Also according to the present invention, there is provided a vapour generating device charging system comprising: the induction heating assembly according to the first aspect of the present invention; a charging device comprising a charging coil arranged to induce a current in the induction coil of the induction heating assembly by producing an electromagnetic field.

By having a charging device produce an electromagnetic field to induce a current in the induction coil of the induction heating assembly to charge the power source, it is possible to provide safe and efficient wireless charging to the vapour generating device.

Although the charging device may take any shape and form, preferably the charging device is substantially cylindrical.

According to another aspect of the present invention, there is provided a method of charging a vapour generating device, the method comprising the steps of: placing a charging device in proximity to an induction heating assembly of the vapour generating device, the induction heating assembly comprising a rechargeable power source and an induction heating coil; and transferring power from the charging device in the form of an electromagnetic field to the induction heating coil of the heating assembly to supply charge to the rechargeable power source.

By using the induction heating coil of the vapour generating device to provide inductive charging to the power source of the device, it is possible to provide wireless charging to the device without the need for a separate second induction arrangement for charging.

Although the charging device may be arranged to interact with the induction coil in any fashion, preferably, a portion of the charging device is at least partially inserted in a volume of the induction heating assembly. This ensures that a proper connection is maintained between the charging device and the induction heating coil to provide a safe and reliable coupling to charge the power source.

Alternatively, at least a portion of the induction heating assembly may be at least partially inserted in a volume of the charging device.

There may be situations in which it is advantageous to provide an electromagnetic field for charging from outside the induction heating assembly. For example, it may be desirable to operate at the same time both the heating and charging functionalities of the induction heating assembly or to operate the heating while the external device is coupled and/or to operate the charging while a body/capsule is in the internal space of the heating compartment, in which case an external source of electromagnetic field which wraps around the induction heating assembly is advantageous. By having the heating assembly arranged to be inserted in an external charging device, it is possible to free up the internal space of the assembly (e.g. internal space of the heating compartment) to be occupied by a substance to be heated (e.g. a body/capsule). The internal space may be defined radially inward of the induction coil and may be arranged to receive a body comprising a vaporisable substance and an induction heatable susceptor or susceptors, for example as described above.

Additionally, for the case that the heating and charging is required at the same time, the induction heating assembly may comprise two coils, one for charging and the other for heating, preferably, in the same track and side by side.

In all cases (i.e. whether a portion of the external charging device is inserted into a volume (e.g. the heating compartment) of the vapour generating device, or where a portion of the vapour generating device is inserted into a volume of the external charging device (e.g. by sleeving a portion of the external charging device over the vapour generating device)), it is preferable if the external charging device may include a primary charging coil (which is operable to induce a current in the induction coil of the vapour generating device) which may be arranged to be substantially co-axial with the induction coil of the vapour generating device and substantially overlapping therewith, when they are coupled together in a charging configuration.

BRIEF DESCRIPTION OF THE DRAWINGS

The invention will now be described by way of example with reference to the accompanying drawings, in which.

DETAILED DESCRIPTION

Figure 1:
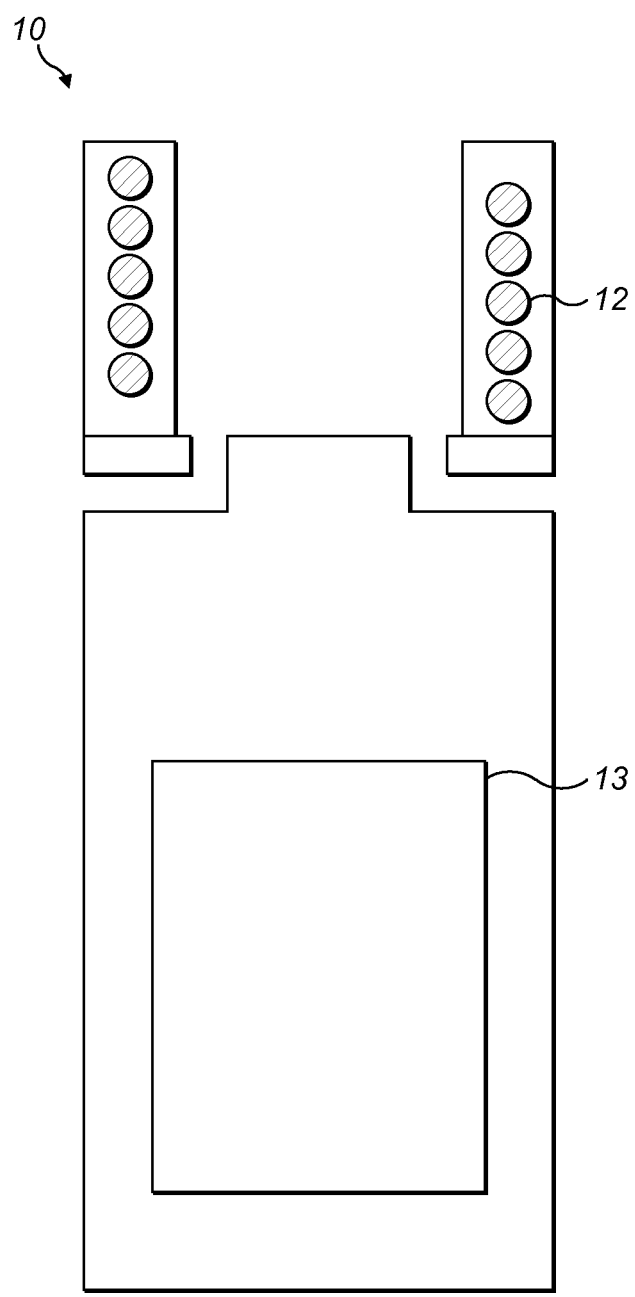
FIG. 1 schematically illustrates an induction heating assembly according to an example of the present invention.

FIG. 1 schematically illustrates an induction heating assembly 10 according to an example of the present invention. In this example, the heating assembly 10 includes an induction coil 12 and a rechargeable power source 13. The power source 13 and the induction coil 12 are placed in electrical connection such that electrical power can be selectively transmitted between the two components. The induction coil 12 is arranged to heat an external susceptor by receiving electrical power from the power source 13 and producing an electromagnetic field. The induction coil 12 is further arranged to receive an externally generated electromagnetic field, to selectively induce an electrical current to charge the rechargeable power source 13. In this example, the induction coil 12 is substantially cylindrical such that the form of the induction heating assembly 10 is also substantially cylindrical.

When operating to heat an external susceptor, an alternating current changed from a direct current supplied by the power source 13 flows through the induction coil 12 to generate a controlled electromagnetic field in a region near the coil 12. The electromagnetic field generated provides a source for an external susceptor to absorb the electromagnetic energy and convert it to heat, thereby achieving induction heating.

The induction heating assembly 10 of FIG. 1 can also be operated to inductively charge the power source 13 when an external source of electromagnetic field is placed near the induction coil 12. When operating to charge the rechargeable power source 13, the induction coil 12 interacts with an external field to absorb electromagnetic energy and induce an alternating current, which is changed to a direct current and transferred to the power source 13 to provide inductive charging. In this manner, the induction coil 12 provides means for both the heating and the charging functionalities of the induction heating assembly 10.

Figure 2B:
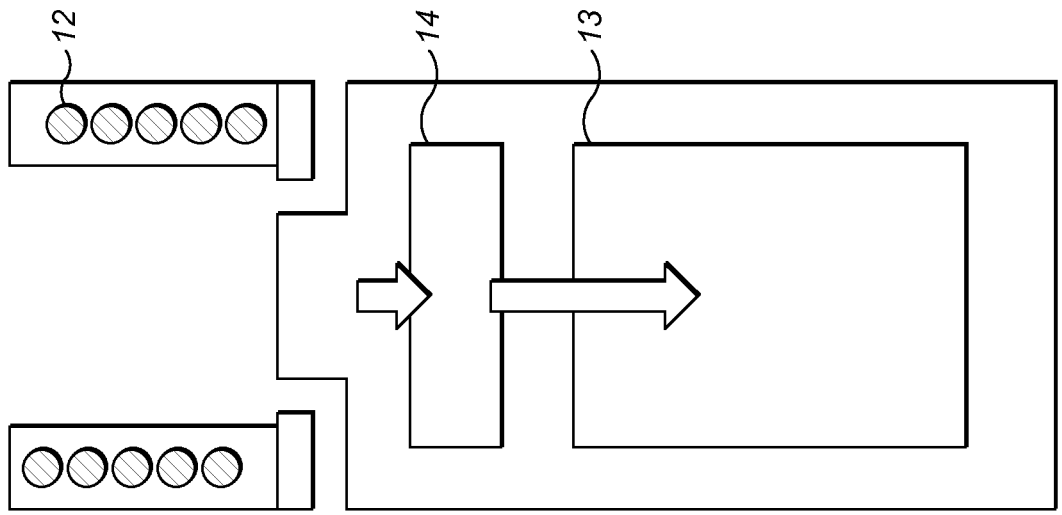
FIG. 2B schematically illustrates the flow of current through the induction heating assembly of FIG. 1, when operating to charge the rechargeable power source.
Figure 2A:
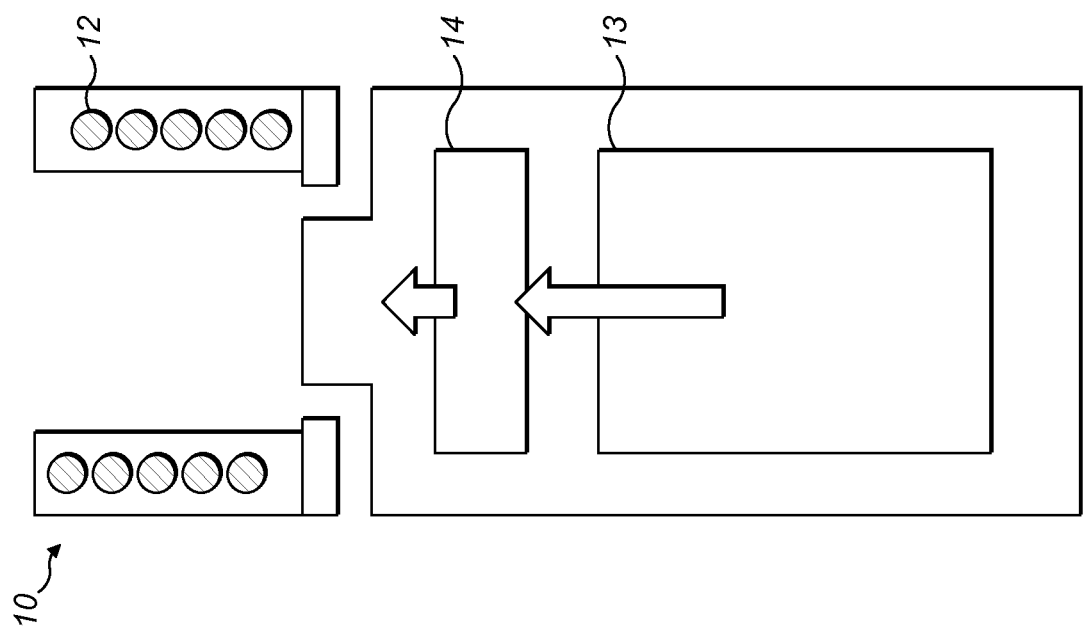
FIG. 2A schematically illustrates the flow of current through the induction heating assembly of FIG. 1, when operating to heat an external susceptor.

In some examples, the induction heating assembly 10 further comprises an induction controller 14, as shown FIGS. 2A and 2B. In this example, the induction controller 14 is arranged to be, in use, in electrical connection with the power source 13 and the induction coil 12, so as to selectively control the electrical current flowing between the power source 13 and the induction coil 12 such that the extent of heating or charging may be regulated. The induction controller 14 is capable of being manually operated by the user to select a heat setting, or programmed to automatically adjust the current through the induction coil 12 according to predetermined parameters.

The induction heating assembly 10 further comprises an inverter arranged to change a direct current from the power source 13 to an alternating high-frequency current for driving the induction coil 12, and a rectifier arranged to change an alternating high-frequency current from the induction coil 12 to a direct current for charging the power source 13.

FIG. 2A illustrates the flow of current through the induction heating assembly 10 when operating to heat an external susceptor. Electrical current from the power source 13, converted to a high-frequency alternating current by the inverter, is selectively supplied to the induction coil 12 by the induction controller 14. The alternating current in the induction coil 12 produces a dynamic electromagnetic field in the region of the coil 12, which can be absorbed by an external susceptor to achieve inductive heating.

FIG. 2B illustrates the flow of current through the induction heating assembly 10 when operating to charge the rechargeable power source 13. Power is received at the induction coil 12 in the form of a dynamic electromagnetic field generated by an external source. The electromagnetic field produces an electromotive force in the induction coil 12 to generate a high-frequency alternating electrical current. The alternating current from the induction coil 12, converted to a direct current by the rectifier, is selectively supplied to the rechargeable power source 13 by the induction controller 14. In this way, the rechargeable power source 13 can be inductively and wirelessly charged by an external source of electromagnetic field, using the induction coil 12 as a receiving susceptor (or equivalently as the secondary winding of a transformer arrangement as is well-known in the art of inductive charging).

Although for the sake of clarity the inverter and the rectifier have been described as separate components, these components can be the same member arranged to operate in reverse, to selectively change a direct current from the power source 13 to a high-frequency alternating current and to selectively change a high-frequency alternating current from the induction coil 12 to a direct current.

Figure 3:
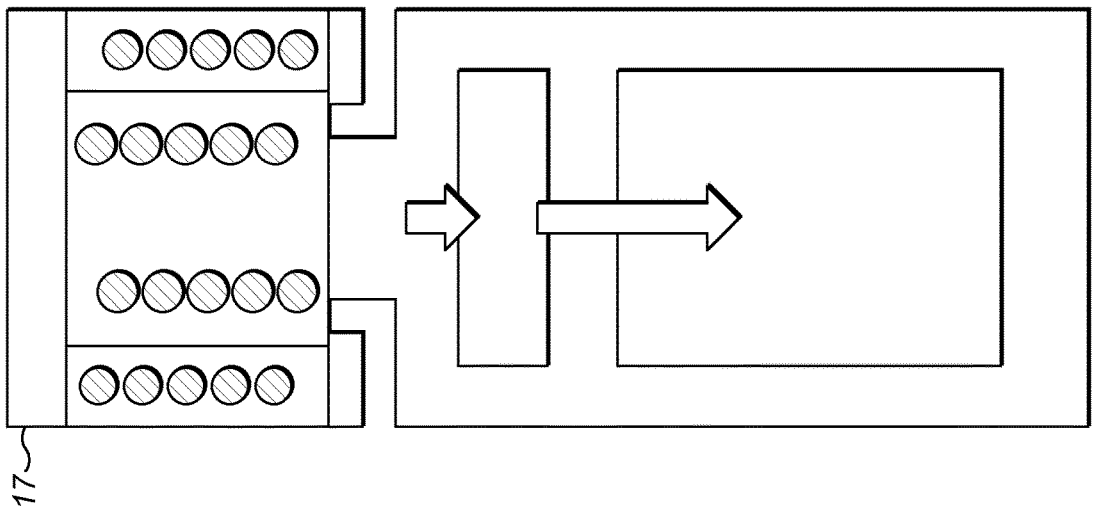
FIG. 3 schematically illustrates how the induction heating assembly of FIGS. 1, 2A and 2B may interact with an external source of electromagnetic field.
Figure 3:
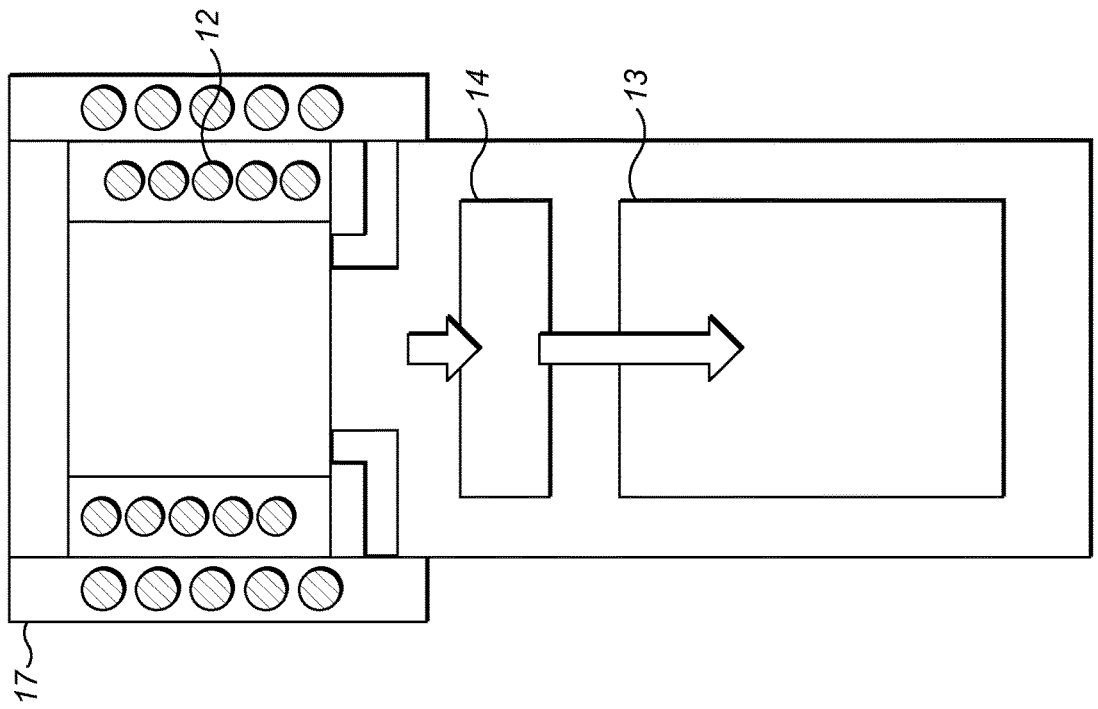

FIG. 3 schematically illustrates two examples of how the induction heating assembly 10 of FIGS. 1, 2A and 2B can interact with an external source of electromagnetic field. As shown in FIG. 3, one possible configuration of the induction heating assembly 10 and the external source 17 of electromagnetic field has at least a portion of the induction heating assembly 10 inserted in a volume of the external source 17 of electromagnetic field. In this configuration, the induction heating assembly 10 is inserted in the external source 17 such that the induction coil 12 of the heating assembly 10 is substantially overlapping with a region of electromagnetic field generation of the external source 17. In this example, the external electromagnetic field is generated by a generating coil in the external source 17, but the field may be produced by any other suitable means, for example by a point source.

In another example, the induction heating assembly 10 is arranged to receive a portion of the external source 17 of electromagnetic field within a volume of the heating assembly 10. In this example, the external source 17 is inserted in the induction heating assembly 10 such that the field generating component of the external source 17 is substantially contained within the interior of the induction coil 12. This arrangement allows the induction heating assembly to be charged safely and reliably while maintaining a compact form.

The induction heating assembly 10 is capable of being operated to charge the power source 13 in either of the above configurations, with the configuration being chosen to suit the needs of the user's demands. For example, it may be desirable to operate at the same time both the heating and charging functionalities of the induction heating assembly 10, in which case an external source 17 of electromagnetic field which wraps around the induction heating assembly 10 is desirable.

Figure 4:
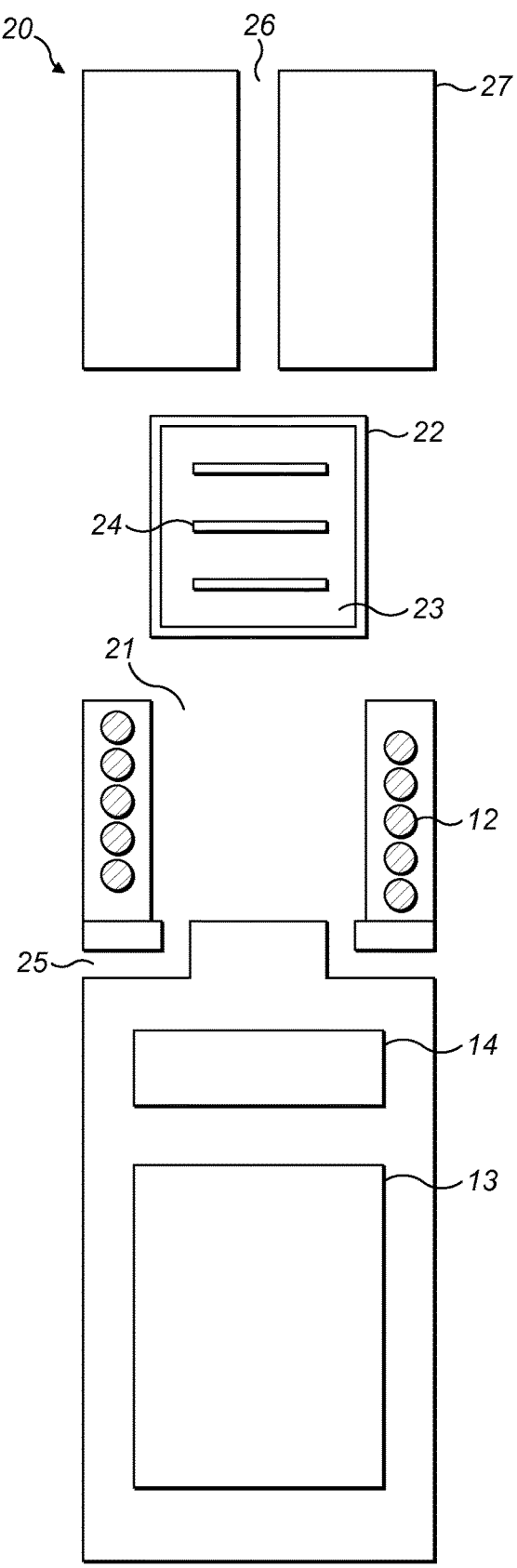
FIG. 4 schematically illustrates an exploded view of a vapour generating device according to an example of the present invention.

FIG. 4 schematically illustrates an exploded view of a vapour generating device 20 according to an example of the present invention. In this example, the vapour generating device comprises the induction heating assembly 10 and further comprises a heating compartment 21, arranged to receive a body 22 comprising a vaporisable substance 23 and an induction heatable susceptor 24. The heating compartment 21 is at least partially adjacent to or contained in the volume of the induction coil 12. An air inlet 25 positioned adjacent to the heating compartment 21 provides air from the surrounding environment to the heating compartment 21. An air outlet 26 is in communication with the heating compartment 21 and provides for the ability to extract vapour produced within the heating compartment 21. All, or some of the components shown in FIG. 4 are arranged to be removable, and FIG. 5 illustrates how the various components of the vapour generating device 20 shown in FIG. 4 assemble together in use.

The heating compartment 21 is arranged to receive a body 22 comprising a vaporisable substance 23 and an induction heatable susceptor 24. Preferably, the body 22 has a layer or membrane to contain the vaporisable substance, with the layer or membrane being air permeable. For example, the body 22 may be a disposable capsule containing tobacco and at least one induction heatable susceptor element. The susceptor 24 can be in direct or indirect contact with the vaporisable substance 23, such that when the susceptor 24 is inductively heated by the induction coil 12 of the induction heating assembly 10, heat is transferred from the susceptor 24 to the vaporisable substance 23, to heat the vaporisable substance 23 and produce a vapour. The vaporisation of the vaporisable substance 23 is facilitated by the addition of air from the surrounding environment through the air inlet 25. The vapour generated by heating the vaporisable substance 23 then exits the heating compartment 21 through the air outlet 26 and may for example be inhaled by a user of the device. The flow of air through the heating compartment 21, i.e. from the air inlet 25 though the compartment 21 and out of the air outlet 26, can be aided by negative pressure created by a user drawing air from the outlet 26 side of the device 20.

When the device 20 is used for generating vapour to be inhaled, a mouthpiece 27 may also be installed on the device, in communication with the air outlet 26. The mouthpiece 27 provides the ability for a user to easily draw the generated vapour from the device 20.

Figure 6:
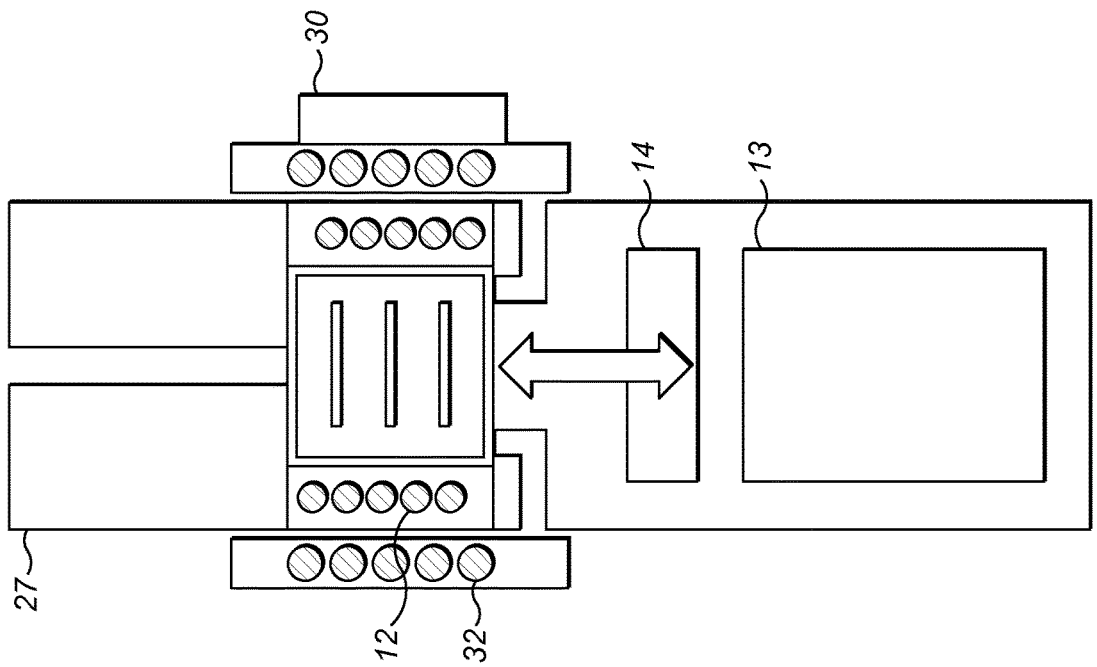
FIG. 6 schematically illustrates another example of how the induction heating assembly of FIGS. 1, 2A and 2B may interact with an example external source of electromagnetic field.
Figure 5:
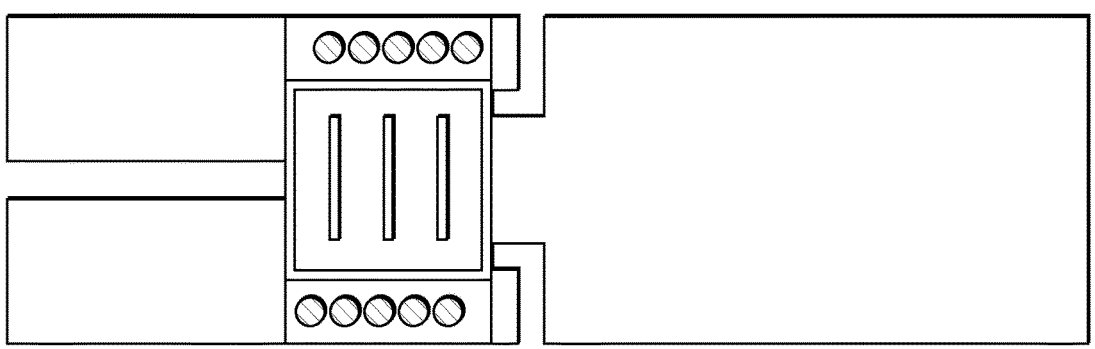
FIG. 5 schematically illustrates the vapour generating device of FIG. 4, in use.

FIG. 6 schematically illustrates how the vapour generating device 20 of FIGS. 4 and 5 can be operated to charge the rechargeable power source 13 and to inductively heat a susceptor 24. An external induction device 30 comprising an external coil 32 surrounds the perimeter of the induction heating assembly 10 such that the central axes of the heating coil 12 and the external coil 32 are substantially overlapping. In this example, the external induction device 30 has two open ends, through which the induction heating assembly 10 may be inserted. There may be means for fixing the position of the external coil 32 in relation to the induction coil 12, such as a snap-fit mechanism. This allows the vapour generating device 20 to be operated to heat a susceptor 24 and charge the rechargeable power source 13 at the same time.

As will be appreciated from the above, the present invention, by avoiding the need for one induction system for heating and another separate induction system for charging, enables the provision of a vapour generating device which is inexpensive, compact, and suitable for portable handheld use. An electronic vapour generating device with a safe and efficient charging mechanism, and a lower component count to reduce size, weight and manufacture cost, is achieved by the invention and yet still enables both the heating and charging functionalities of such a vapour generating device.

The invention claimed is:

1. An induction heating assembly for a vapour generating device, the heating assembly comprising:
   a rechargeable power source; and
   an induction coil; wherein
   the induction coil is arranged to heat, in use, a susceptor and is also arranged to receive, in use, an electromagnetic field generated by an external source to charge the power source.

2. The induction heating assembly according to claim 1, further comprising:
   a rectifier arranged to change a high-frequency alternating current induced in the induction coil by an electromagnetic field generated by the external source into a form suitable for charging the rechargeable power source.

3. The induction heating assembly according to claim 2, wherein the rectifier is arranged to change the high-frequency alternating current from the induction coil into a direct current.

4. The induction heating assembly according to claim 3, further comprising:
   an inverter arranged to change a direct current from the power source to an alternating high-frequency current; and
   an induction controller arranged to be, in use, in electrical connection with the power source, the induction coil, the rectifier, and the inverter such that, in use, the alternating high-frequency current can be selectively supplied to the induction coil and a susceptor can be inductively heated by the induction coil and, in use, a direct current can be selectively supplied to the power source when power is received at the induction coil in the form of an electromagnetic field generated by an external source, to inductively charge the power source.

5. The induction heating assembly according to claim 1, wherein the induction coil is substantially cylindrical in shape.

6. The induction heating assembly according to claim 4, wherein the inverter and the rectifier are the same member arranged to selectively change a direct current from the power source to an alternating high-frequency current, and to selectively change an alternating high-frequency current from the induction coil to a direct current.

7. The induction heating assembly according to claim 1, wherein the assembly is arranged to receive at least a portion of the external source of an electromagnetic field within its volume.

8. The induction heating assembly according to claim 1, wherein at least a portion of the assembly is arranged to be, in use, inserted in a volume of the external source of an electromagnetic field.

9. A vapour generating device comprising:
   an induction heating assembly comprising:
      a rechargeable power source; and
      an induction coil arranged to heat, in use, a susceptor and is also arranged to receive, in use, an electromagnetic field generated by an external source to charge the power source;
   a heating compartment arranged to receive a body comprising a vaporisable substance and an induction heatable susceptor;
   an air inlet arranged to provide air to the heating compartment; and
   an air outlet in communication with the heating compartment.

10. The vapour generating device according to claim 9, wherein the heating compartment is arranged to receive a substantially cylindrical vaporisable article.

11. A vapour generating device charging system comprising:
    the induction heating assembly according to claim 1; and
    a charging device comprising a charging coil arranged to induce a current in the induction coil of the induction heating assembly by producing an electromagnetic field.

12. The vapour generating device charging system according to claim 11, wherein the charging device is substantially cylindrical.

13. A method of charging a vapour generating device, the method comprising the steps of:
    placing a charging device in proximity to an induction heating assembly of the vapour generating device, the induction heating assembly comprising a rechargeable power source and an induction heating coil; and
    transferring power from the charging device in the form of an electromagnetic field to the induction heating coil of the heating assembly to supply charge to the rechargeable power source.

14. The method according to claim 13, wherein a portion of the charging device is at least partially inserted in a volume of the induction heating assembly.

15. The method according to claim 13, wherein a portion of the induction heating assembly is at least partially inserted in a volume of the charging device.

16. The induction heating assembly according to claim 1, comprising an induction controller configured to selectively control the induction coil to heat, in use, the susceptor and to receive, in use, the electromagnetic field generated by the external source to charge the power source.

17. The induction heating assembly according to claim 1, wherein the external source and the induction heating assembly are separable from one another.

18. The method according to claim 13, wherein the vapour generating device comprises:
    an induction heating assembly comprising:
       a rechargeable power source; and
       an induction coil arranged to heat, in use, a susceptor and is also arranged to receive, in use, an electromagnetic field generated by an external source to charge the power source;
    a heating compartment arranged to receive a body comprising a vaporisable substance and an induction heatable susceptor;
    an air inlet arranged to provide air to the heating compartment; and
    an air outlet in communication with the heating compartment.

* * * * *